(12) United States Patent
Goto et al.

(10) Patent No.: US 11,131,512 B2
(45) Date of Patent: Sep. 28, 2021

(54) HEATING DEVICE

(71) Applicant: Rinnai Corporation, Nagoya (JP)

(72) Inventors: Yoshio Goto, Nagoya (JP); Daisuke Naito, Nagoya (JP); Shigeki Takeuchi, Nagoya (JP)

(73) Assignee: Rinnai Corporation, Nagoya (JP)

( * ) Notice: Subject to any disclaimer, the term of this patent is extended or adjusted under 35 U.S.C. 154(b) by 287 days.

(21) Appl. No.: 16/454,096

(22) Filed: Jun. 27, 2019

(65) Prior Publication Data
US 2020/0072557 A1 Mar. 5, 2020

(30) Foreign Application Priority Data

Aug. 30, 2018 (JP) .............................. JP2018-161096

(51) Int. Cl.
| | |
|---|---|
| *F28D 21/00* | (2006.01) |
| *F28F 9/00* | (2006.01) |
| *F24H 9/00* | (2006.01) |
| *F24H 9/14* | (2006.01) |

(52) U.S. Cl.
CPC ....... *F28D 21/0007* (2013.01); *F24H 9/0021* (2013.01); *F24H 9/148* (2013.01); *F28F 9/005* (2013.01); *F28F 2230/00* (2013.01)

(58) Field of Classification Search
CPC ................................................ F28D 21/0007
See application file for complete search history.

(56) References Cited

U.S. PATENT DOCUMENTS

| | | | | |
|---|---|---|---|---|
| 2012/0272928 | A1* | 11/2012 | Kameyama | ............... F24H 1/28 122/19.2 |
| 2014/0000534 | A1* | 1/2014 | Naitoh | .................. F23D 14/045 122/14.21 |
| 2016/0273850 | A1* | 9/2016 | Okamoto | .............. F28F 21/083 |
| 2017/0059205 | A1* | 3/2017 | Kim | .......................... F24H 8/00 |
| 2018/0087805 | A1* | 3/2018 | Ooshita | ................ F28D 7/0091 |
| 2018/0195759 | A1 | 7/2018 | Matsunaga et al. | |

FOREIGN PATENT DOCUMENTS

| | | |
|---|---|---|
| JP | 2017-512966 | 5/2017 |
| JP | 2018-031533 | 3/2018 |

OTHER PUBLICATIONS

Extended European Search Report for European Patent Application No. 19190159.4 dated Feb. 20, 2020.

* cited by examiner

*Primary Examiner* — Nathaniel Herzfeld
(74) *Attorney, Agent, or Firm* — Amin, Turocy & Watson, LLP

(57) ABSTRACT

The exhaust duct includes an exhaust collecting portion connected a heat exchanger and an exhaust guiding portion communicating with the exhaust collecting portion and extended upward in a state close to a side of a cylindrical body of the heat exchanger. The exhaust collecting portion includes a connection opening constituting an inner peripheral wall, into which a cylindrical outlet side connection portion at the lower end of the heat exchanger is fitted, and a groove provided on an outer peripheral side than the inner peripheral wall of the connection opening. The packing includes a seal portion sandwiched in a compressed state between the inner peripheral wall of the connection opening in the exhaust collecting portion and an outer peripheral wall of the cylindrical outlet side connection portion in the heat exchanger to constitute a seal and an anchor portion inserted into the groove of the exhaust collecting portion.

8 Claims, 4 Drawing Sheets

HEATING DEVICE

BACKGROUND OF THE INVENTION

Field of the Invention

The present invention relates to a heating device including a seal structure in which a packing is provided at a connection portion between a heat exchanger and an exhaust duct.

Description of the Related Art

Conventionally, a heating device such as a boiler or a water heater includes a burner for generating combustion exhaust gas, a heat exchanger for flowing the combustion exhaust gas from the burner, and an exhaust duct for discharging the combustion exhaust gas flowing out of the heat exchanger. For example, in a heating device including a burner for burning downward, an exhaust duct is configured so that an exhaust collecting portion is connected with a lower portion of a heat exchanger and an exhaust guiding portion communicated with the exhaust collecting portion is disposed on a side of the heat exchanger by extending upward from the lower portion (for example, JP 2017-512966, JP 2018-31533). A packing is disposed to seal a connection portion between the heat exchanger and the exhaust duct in order to prevent leakage of combustion exhaust gas. In this case, generally, outward horizontal flanges are provided at the connection portion between the heat exchanger and the exhaust duct, the packing is sandwiched between the horizontal flanges, screws are tightened, and the packing is compressed for sealing. Accordingly, the leakage of the combustion exhaust gas is prevented (see FIG. 8 of JP 2017-512966).

SUMMARY OF THE INVENTION

By the way, in order to make the above-mentioned heating device into a compact configuration, it is conceivable that the exhaust guiding portion of the exhaust duct is made as close as possible to the heat exchanger. In this case, since a gap between the heat exchanger and the exhaust guiding portion becomes small, widths of the horizontal flanges and the packing become narrow, and a seal length of the packing cannot be sufficiently secured. Simultaneously, it is difficult to fix the horizontal flanges with the screws and the like. As a result, seal performance of the connection portion is lowered, and leakage of the combustion exhaust gas may occur.

The present invention has been made in view of the above circumstances, and it is an object of the present invention to provide a heating device capable of sufficiently exhibiting seal performance without using screws and the like and yet making the heating device compact.

A heating device according to the present invention includes:

a burner for generating combustion exhaust gas by burning downward;

a heat exchanger connected to a lower end of the burner and having a cylindrical body for flowing the combustion exhaust gas from the burner downward;

an exhaust duct connected to a lower end of the heat exchanger; and a packing provided at a connection portion between the heat exchanger and the exhaust duct, wherein the exhaust duct includes an exhaust collecting portion for receiving the combustion exhaust gas flowing out from the lower end of the heat exchanger and an exhaust guiding portion communicating with the exhaust collecting portion and extended upward in a state close to a side of the cylindrical body of the heat exchanger, the exhaust collecting portion includes a connection opening forming an inner peripheral wall, into which a cylindrical outlet side connection portion at a downstream end of the heat exchanger is fitted, and a groove provided on an outer peripheral side than the inner peripheral wall of the connection opening, and the packing includes a seal portion sandwiched in a compressed state between the inner peripheral wall of the connection opening in the exhaust collecting portion and an outer peripheral wall of the cylindrical outlet side connection portion in the heat exchanger to form a seal and an anchor portion inserted into the groove of the exhaust collecting portion.

According to the above configuration, a seal structure of the connection portion between the heat exchanger and the exhaust duct is different from a conventional configuration in which outward horizontal flanges sandwiching a packing are extended and fixed by screws. By inserting the heat exchanger into the exhaust duct, it is possible to secure a long seal length at the connection portion between the heat exchanger and the exhaust duct. Therefore, stable seal performance can be obtained without the horizontal flanges that sandwiching the packing. Hence, it is not necessary to provide the horizontal flange or the space for fixing the screws, and the exhaust guiding portion of the exhaust duct can be made close to the side of the cylindrical body of the heat exchanger to make the heating device compact. In addition, it is possible to reduce the number of screws for compressing the seal portion of the packing.

In addition, since the seal portion is configured to insert the heat exchanger into the exhaust duct to seal between the inner peripheral wall of the connection opening and the outer peripheral wall of the cylindrical outlet side connection portion, drain water generated in the heat exchanger is hard to flow to the outer peripheral wall of the cylindrical outlet side connection portion, and it is possible to make the drain water less likely to leak to the outside.

Further, since the packing is held by inserting the anchor portion into the groove of the exhaust collecting portion, when the heat exchanger is inserted into the exhaust duct, the seal portion can be prevented from being caught by the cylindrical outlet side connection portion of the heat exchanger unexpectedly. Therefore, the seal portion is reliably sandwiched in the compressed state between the inner peripheral wall of the connection opening and the outer peripheral wall of the cylindrical outlet side connection portion. Accordingly, seal performance can be exhibited. Further, since the heat exchanger is inserted into the exhaust duct, when the anchor portion is pulled by the seal portion, the packing is pressed toward the groove. Accordingly, a degree of adhesion between the packing and the groove is increased, and the seal performance can be enhanced.

DETAILED DESCRIPTION OF THE PREFERRED EMBODIMENT

Hereinafter, a preferred embodiment of the present invention will be described with reference to the attached drawings.

Figure 1:
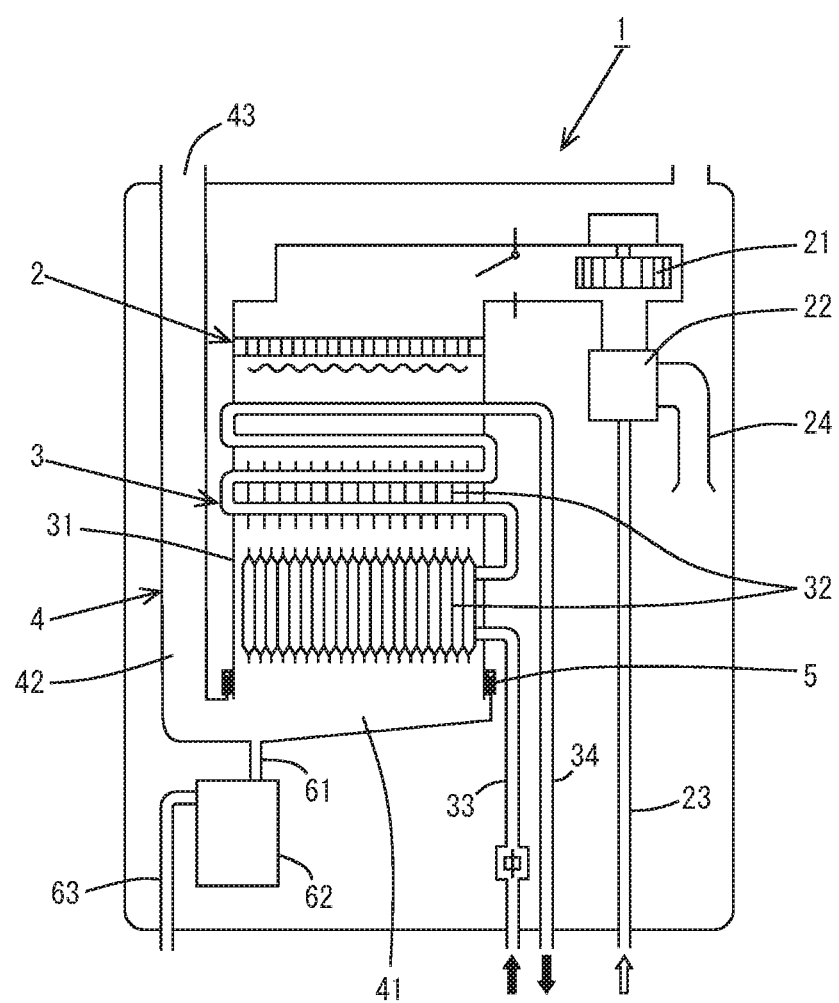
FIG. 1 is a schematic view showing a configuration of a heating device according to a preferred embodiment.

As shown in FIG. 1, a heating device 1 of the preferred embodiment constitutes the heating device 1 such as a boiler or a water heater. The heating device 1 includes a burner 2 burning downward, a heat exchanger 3 connected to a lower end of the burner 2, and an exhaust duct 4 connected to a lower end of the heat exchanger 3. Further, an annular packing 5 is disposed to seal a connection portion between the heat exchanger 3 and the exhaust duct 4 in order to prevent leakage of combustion exhaust gas.

The burner 2 is connected, on an upstream side, to a combustion fan 21 and a premixer 22 for mixing fuel gas and air. A gas introducing pipe 23 and an air introducing pipe 24 are connected to the premixer 22. When mixture gas (fuel gas and the air) is supplied from the premixer 22 by operation of the combustion fan 21, the burner 2 burns the mixture gas downward to generate combustion exhaust gas.

The heat exchanger 3 includes a rectangular cylindrical body 31 for flowing the combustion exhaust gas from the burner 2 from an upper side to a lower side and a heat exchange unit 32 disposed in this cylindrical body 31. A water supply pipe 33 communicating with a tank, a water pipe, etc. is connected to an upstream side of the heat exchange unit 32. A hot water discharge pipe 34 communicating with a use destination of heated fluid such as hot water is connected to a downstream side of the heat exchange unit 32. The heat exchanger 3 has a sensible heat exchange unit at the top and a latent heat exchange unit at the bottom. The heat exchanger 3 heats fluid such as water supplied through the water supply pipe 33 by the combustion exhaust gas, and supplies the heated fluid to the use destination of the heated fluid through the hot water discharge pipe 34.

The exhaust duct 4 has a tray-like exhaust collecting portion 41 connected to the lower end of the heat exchanger 3 and an exhaust guiding portion 42 integrally formed with and communicating with the exhaust collecting portion 41. The exhaust guiding portion 42 is bent upward from the exhaust collecting portion 41 disposed below and extended upward in a state close to a side of the heat exchanger 3. The exhaust duct 4 receives the combustion exhaust gas flowing out of the lower end of the heat exchanger 3 at the exhaust collecting portion 41 and discharges the exhaust gas from an exhaust port 43 on an upper surface of the device to the outside of the device through the exhaust guiding portion 42. A drain discharge pipe 61 is extended from the exhaust collecting portion 41 and is connected to a neutralizer 62 having an outlet pipe 63.

Figure 2:
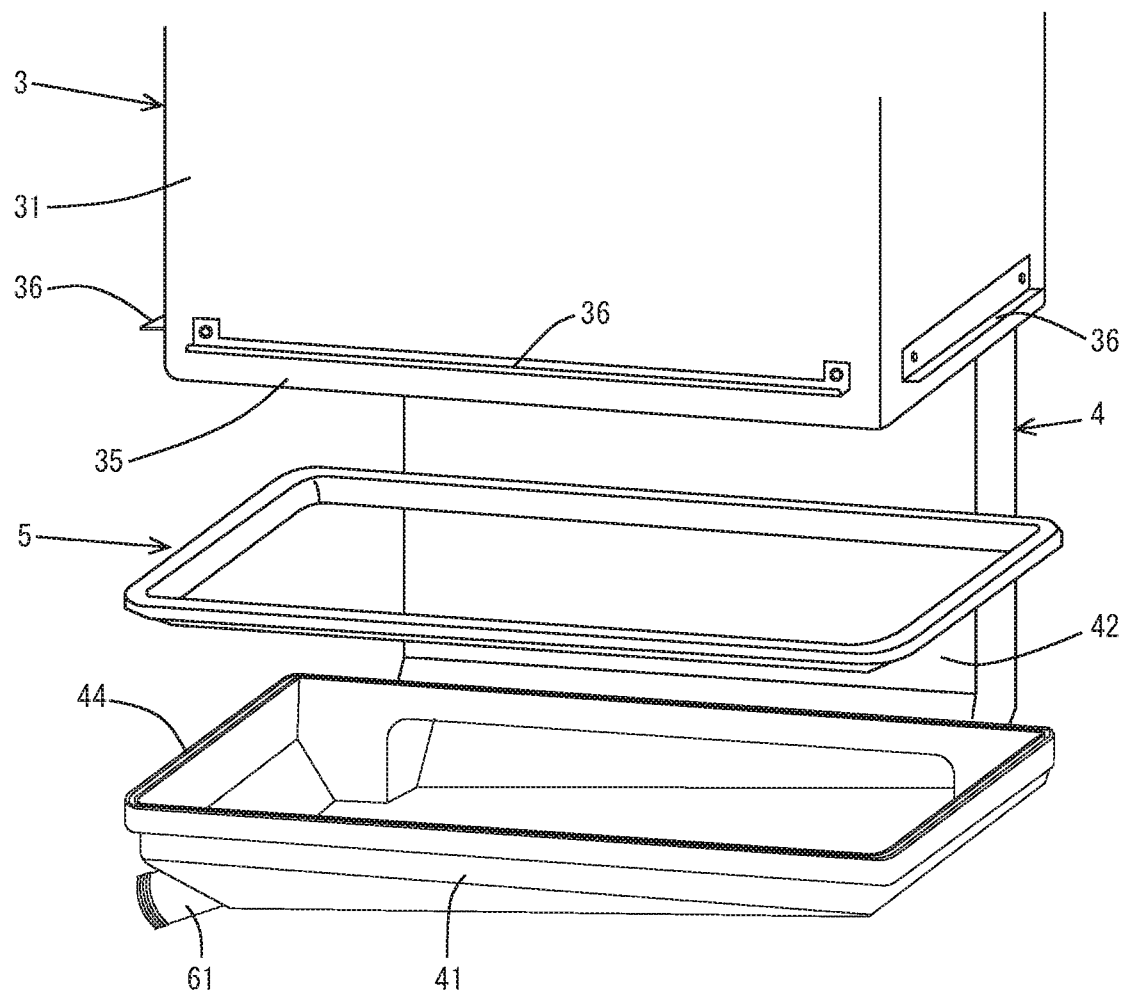
FIG. 2 is an exploded perspective view showing a connection portion between a heat exchanger and an exhaust duct.
Figure 3:
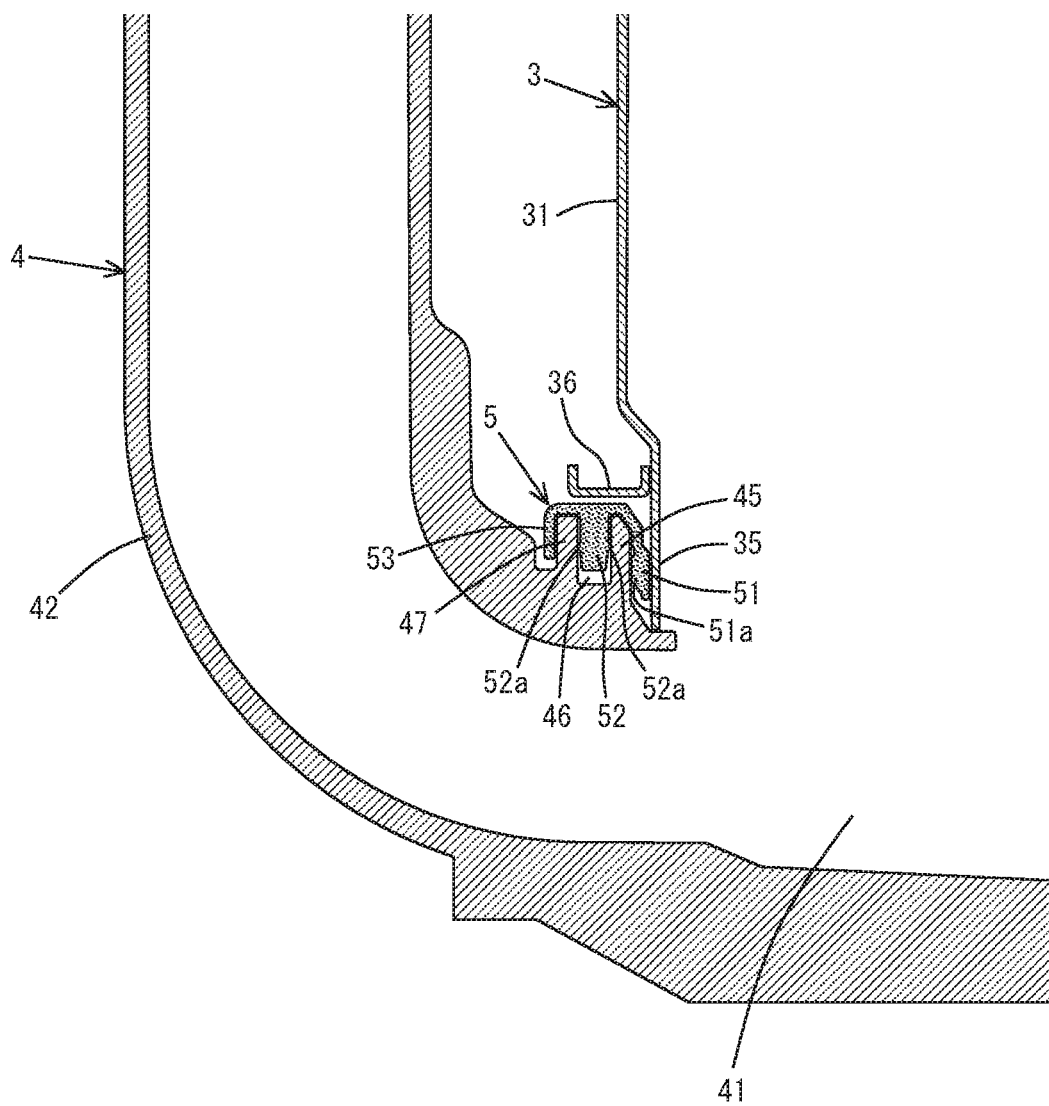
FIG. 3 is a cross-sectional view showing the connection portion between the heat exchanger and the exhaust duct.

With reference to FIGS. 2 and 3, in the heat exchanger 3, a lower end side (downstream side) of the cylindrical body 31 constitutes a cylindrical outlet side connection portion 35 opened in a cylindrical shape. This cylindrical outlet side connection portion 35 is a connection portion connected with the exhaust duct 4 via the packing 5. The cylindrical body 31 of the heat exchanger 3 is formed of a metal material such as stainless steel.

An opened upper end outer edge of the exhaust collecting portion 41 in the exhaust duct 4 constitutes a cylindrical portion 44 extending toward the heat exchanger 3. This cylindrical portion 44 is a connection portion, to which the packing 5 is attached and to which the cylindrical outlet side connection portion 35 of the heat exchanger 3 is inserted and connected. Specifically, the cylindrical portion 44 at the upper end outer edge of the exhaust collecting portion 41 has a connection opening 45 constituting an inner peripheral wall, into which the cylindrical outlet side connection portion 35 at the lower end of the heat exchanger 3 is fitted, an annular groove 46 provided on an outer peripheral side than the inner peripheral wall of the connection opening 45, and an upright wall 47 standing on an outer peripheral side of the groove 46. The exhaust duct 4 is formed of a resin material such as PP.

The packing 5 is, for example, an annular seal member formed of a rubber material having heat resistance and acid resistance such as EPDM and fluorine rubber. This packing 5 is attached to the cylindrical portion 44 which is the upper end outer edge of the exhaust collecting portion 41, and has a cross-sectional shape covering the cylindrical portion 44. In other words, referring also to FIG. 4, the packing 5 includes a seal portion 51 covering the inner peripheral wall of the connection opening 45 of the exhaust collecting portion 41, an anchor portion 52 provided on an outer peripheral side of the seal portion 51 and inserted into the groove 46 of the exhaust collecting portion 41, and an outer peripheral flange portion 53 provided on an outer peripheral side of the anchor portion 52 and covering the upright wall 47 of the exhaust collecting portion 41.

In a connected state in which the cylindrical outlet side connection portion 35 of the heat exchanger 3 is inserted into the connection opening 45 of the exhaust collecting portion 41, the seal portion 51 is sandwiched in a compressed state between the inner peripheral wall of the connection opening 45 and the outer peripheral wall of the cylindrical outlet side connection portion 35 to form a seal. In this case, a lower end of the cylindrical outlet side connection portion 35 of the heat exchanger 3 is disposed lower than a tip of the seal portion 51 so as to completely hide the seal portion 51 (see FIG. 3). However, the lower end of the cylindrical outlet side connection portion 35 may be disposed at a height position sandwiching at least a seal function portion (for example, a thick portion 51a described later) of the seal portion 51 so that the seal portion 51 is sandwiched in a compressed state. This seal structure is different from a conventional configuration in which outward horizontal flanges sandwiching a packing at a connection portion between a heat exchanger and an exhaust duct are extended and fixed by screws. Since the heat exchanger 3 is inserted into the exhaust duct 4, a seal length by the seal portion 51 can be sufficiently secured between the inner peripheral wall of the connection opening 45 and the outer peripheral wall of the cylindrical outlet side connection portion 35, and stable seal performance can be obtained.

By the way, in a case of the heating device 1 including the burner 2 burning downward and connecting the exhaust duct 4 to the lower end of the heat exchanger 3, the exhaust duct 4 extends upward from the lower portion. In other words, the exhaust guiding portion 42 of the exhaust duct 4 is disposed to extend vertically on the side of the heat exchanger 3 including the connection portion between the exhaust duct 4 and the heat exchanger 3. In this case, if the outward horizontal flanges sandwiching the packing protrude at the connection portion between the heat exchanger and the exhaust duct as in the conventional configuration, it is difficult to make the heating device compact by bringing the exhaust guiding portion of the exhaust duct close to the heat exchanger. Since it is difficult to make the widths of the horizontal flanges as narrow as possible to secure the seal length of the packing and secure a space for screwing, it is also difficult to make the widths of the horizontal flanges narrow and to bring the exhaust guiding portion of the exhaust duct close to the heat exchanger.

On the other hand, according to the present preferred embodiment, the seal length is secured between the inner peripheral wall of the connection opening 45 and the outer peripheral wall of the cylindrical outlet side connection portion 35 simply by inserting the heat exchanger 3 into the exhaust duct 4. Therefore, stable seal performance can be obtained without the conventional horizontal flanges for sandwiching the packing. Therefore, it is not necessary to provide the horizontal flanges or the space for fixing the screws, and the exhaust guiding portion 42 of the exhaust duct 4 can be made close to the side of the heat exchanger 3 to make the heating device 1 compact. In addition, it is possible to reduce the number of screws for compressing the seal portion 51 of the packing 5.

The seal portion 51 is configured to insert the heat exchanger 3 into the exhaust duct 4 to seal between the inner peripheral wall of the connection opening 45 and the outer peripheral wall of the cylindrical outlet side connection portion 35. Hence, a direction of drain water generated in the heat exchanger 3 leaking from inner and outer peripheral surfaces of the seal portion 51 is an opposite direction (upward direction) to a flow in a forward direction (downward direction) of the drain water in the heat exchanger 3. Therefore, the drain water generated in the heat exchanger 3 is hard to flow to the outer peripheral wall of the cylindrical outlet side connection portion 35. Furthermore, the seal portion 51 of the packing 5 can reliably prevent the drain water from leaking out to the outside from the connection portion between the heat exchanger 3 and the exhaust duct 4.

Further, since the packing 5 not only covers the cylindrical portion 44 of the exhaust collecting portion 41 but also has the anchor portion 52 inserted into the groove 46 of the exhaust collecting portion 41, the seal portion 51 of the packing 5 is held relatively strongly at the connection opening 45 of the exhaust collecting portion 41. Thereby, though the seal portion 51 is pulled by the cylindrical outlet side connection portion 35 of the heat exchanger 3 upon insertion of the heat exchanger 3 into the exhaust duct 4, since the anchor portion 52 is inserted and held in the groove 46, the seal portion 51 can be prevented from being caught by the cylindrical outlet side connection portion 35 unexpectedly. Therefore, the seal portion 51 is reliably sandwiched in a compressed state between the inner peripheral wall of the connection opening 45 and the outer peripheral wall of the cylindrical outlet side connection portion 35, so that seal performance can be exhibited stably. Further, since the heat exchanger 3 is inserted into the exhaust duct 4, when the anchor portion 52 is pulled by the seal portion 51, the packing 5 is pressed toward the groove 46. Accordingly, a degree of adhesion between the packing 5 and the groove 46 is increased, and the seal performance can be further enhanced.

Further, the seal portion 51 of the packing 5 has the thick portion 51a protuberant on a part of the outer peripheral surface facing the connection opening 45 of the exhaust collecting portion 41. By providing the thick portion 51a, the heat exchanger 3 can be smoothly inserted into the exhaust duct 4. In other words, in the present seal structure, in order to sandwich the seal portion 51 in a compressed state between the inner peripheral wall of the connection opening 45 and the outer peripheral wall of the cylindrical outlet side connection portion 35, the heat exchanger 3 is inserted and assembled into the exhaust duct 4 while sliding the heat exchanger 3 into the seal portion 51. At this time, when the inner and outer peripheral surfaces of the seal portion 51 are in close contact with the inner peripheral wall of the connection opening 45 and the outer peripheral wall of the cylindrical outlet side connection portion 35, the heat exchanger 3 may be difficult to insert.

On the other hand, by providing the thick portion 51a in the seal portion 51, when the heat exchanger 3 is inserted into the exhaust duct 4, the close contact between the seal portion 51 and the inner peripheral wall of the connection opening 45 is suppressed by the thick portion 51a, and further, the thick portion 51a is compressed and deformed toward the inner peripheral wall of the connection opening 45. As a result, frictional resistance with the seal portion 51 upon insertion of the heat exchanger 3 into the exhaust duct 4 is suppressed, and the insertion of the heat exchanger 3 into the exhaust duct 4 can be performed easily and smoothly. Further, when the seal portion 51 is in the compressed state between the inner peripheral wall of the connection opening 45 and the outer peripheral wall of the cylindrical outlet side connection portion 35, a degree of adhesion to the inner and outer peripheral walls is increased by elastic force of the thick portion 51a. Accordingly, the seal performance can be enhanced. In the preferred embodiment, the thick portion 51a is provided on the outer peripheral surface of the seal portion 51. However, even when the thick portion 51a is provided on the inner peripheral surface of the seal portion 51, the same effect as above is exhibited. However, by providing the thick portion 51a on the outer peripheral surface of the seal portion 51, when the heat exchanger 3 is inserted into the exhaust duct 4, there is no risk of damaging the seal portion 51 caused by catching of the lower end of the heat exchanger 3 by the thick portion 51a. Further, on the outer peripheral surface of the seal portion 51, a protrusion 51b is provided at a bendable position above the thick portion 51a to reinforce strength of the seal portion 51.

Figure 4:
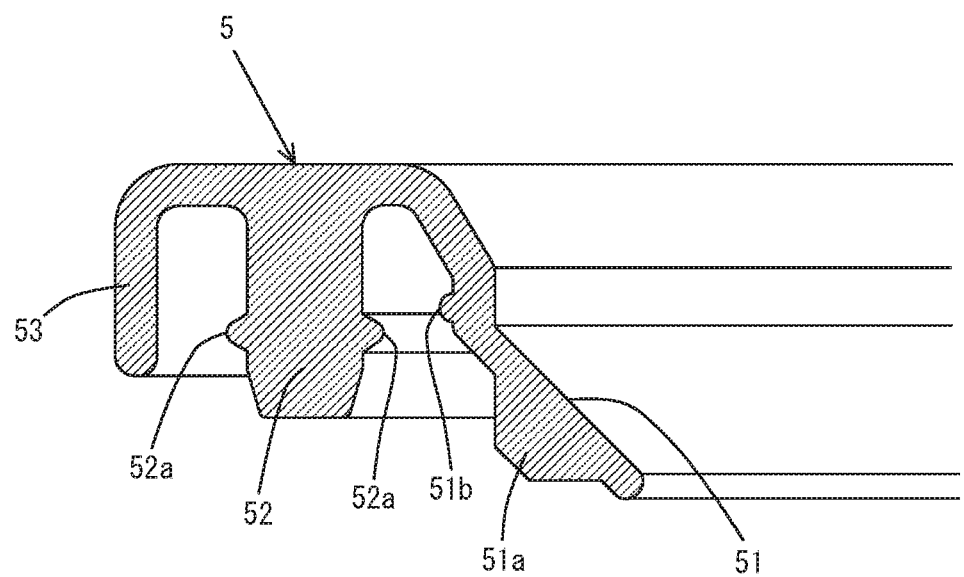
FIG. 4 is a cross-sectional view showing a packing in a non-compressed state before the packing is attached to the connection portion between the heat exchanger and the exhaust duct.

The seal portion 51 of the packing 5 is elastically deformable, and as shown in FIG. 4, the seal portion 51 has, in a non-compressed state, a skirt shape expanded inward in the connection opening 45 toward the tip. Thus, when the packing 5 is attached to the exhaust collecting portion 41, the seal portion 51 is easily disposed on the inner peripheral wall of the connection opening 45. Therefore, the anchor portion 52 is easily inserted into the groove 46 of the exhaust collecting portion 41, and the packing 5 can be easily attached. When the heat exchanger 3 is inserted, the skirt-shaped seal portion 51 is elastically deformed and pressed against the outer peripheral wall of the cylindrical outlet side connection portion 35 of the heat exchanger 3. Accordingly, the degree of adhesion between the seal portion 51 and the outer peripheral wall of the cylindrical outlet side connection portion 35 is increased, and the seal performance can be enhanced.

The anchor portion 52 of the packing 5 has thickness approximately same as or smaller than a groove width of the groove 46, and has a protruded portions 52a on both inner and outer peripheral surfaces so that the thickness of the anchor portion 52 is partly wider than the groove width of the groove 46. The protruded portions 52a are provided on the inner and outer peripheral surfaces of the anchor portion 52, respectively, in one line at the same height position.

Thereby, seal performance is secured by the protruded portions 52a of the anchor portion 52 in the groove 46, can be doubly guaranteed by the seal portion 51 and the anchor portion 52, and can be further enhanced with the minimum components. Further, when the packing 5 is attached to the exhaust collecting portion 41, frictional resistance with the groove 46 is suppressed by the protruded portions 52a upon insertion of the anchor portion 52 into the groove 46. Accordingly, the anchor portion 52 can be easily inserted into the groove 46. Note that the protruded portions 52a may be provided in a plurality of lines on a peripheral surface of the anchor portion 52, or may be provided on only one of the inner and outer peripheral surfaces of the anchor portion 52.

An outer peripheral flange portion 53 of the packing 5 is provided so as to cover the upright wall 47 of the exhaust collecting portion 41. Therefore, even if the packing 5 receives external force from the outside, the outer peripheral flange portion 53 prevents the packing 5 from rising, and partial falling off of the packing 5 can be prevented. Further, since the outer peripheral flange portion 53 is formed so as to hang substantially parallel to the anchor portion 52 even before the packing 5 is attached to the exhaust collecting portion 41, the outer peripheral flange portion 53 can be used as alignment when the packing 5 is attached to the cylindrical portion 44 of the exhaust collecting portion 41.

A projecting piece 36 (see FIGS. 2 and 3) is provided at a height position close to a top surface of the packing 5 in the cylindrical body 31 of the heat exchanger 3. As a result, even if the packing 5 floats up in a direction in which the packing 5 is detached from the exhaust collecting portion 41, the packing 5 can be prevented from being dislocated, falling off, etc. by coming into contact with the projecting piece 36. A protruding length of the projecting piece 36 is a length that does not protrude outward beyond the packing 5. Further, although the projecting piece 36 is provided on all four surfaces of the cylindrical body 31, it may be provided only on two surfaces adjacent to both sides of a surface facing the exhaust guiding portion 42 of the exhaust duct 4.

The present invention is not limited to the above preferred embodiment, and various modifications can be made within the scope of the claims.

What is claimed is:

1. A heating device comprising:
    a burner for generating combustion exhaust gas by burning downward;
    a heat exchanger connected to a lower end of the burner and having a cylindrical body for flowing the combustion exhaust gas from the burner downward;
    an exhaust duct connected to a lower end of the heat exchanger; and
    a packing provided at a connection portion between the heat exchanger and the exhaust duct,
    wherein the exhaust duct includes an exhaust collecting portion for receiving the combustion exhaust gas flowing out from the lower end of the heat exchanger and an exhaust guiding portion communicating with the exhaust collecting portion and extended upward in a state close to a side of the cylindrical body of the heat exchanger,
    the exhaust collecting portion includes a connection opening forming an inner peripheral wall, into which a cylindrical outlet side connection portion at a downstream end of the heat exchanger is fitted, and a groove provided on an outer peripheral side than the inner peripheral wall of the connection opening, and
    the packing includes a seal portion sandwiched in a compressed state between the inner peripheral wall of the connection opening in the exhaust collecting portion and an outer peripheral wall of the cylindrical outlet side connection portion in the heat exchanger to form a seal and an anchor portion inserted into the groove of the exhaust collecting portion.

2. The heating device according to claim 1, wherein the seal portion of the packing is elastically deformable, and the seal portion has, in a non-compressed state, a skirt shape expanded inward of the connection opening toward a tip.

3. The heating device according to claim 1, wherein the seal portion of the packing has a thick portion protuberant on a part of a peripheral surface.

4. The heating device according to claim 2, wherein the seal portion of the packing has a thick portion protuberant on a part of a peripheral surface.

5. The heating device according to claim 1, wherein the anchor portion of the packing has a protruded portion on peripheral surfaces so that at least a part of the anchor portion is wider than the groove.

6. The heating device according to claim 2, wherein the anchor portion of the packing has a protruded portion on peripheral surfaces so that at least a part of the anchor portion is wider than the groove.

7. The heating device according to claim 3, wherein the anchor portion of the packing has a protruded portion on peripheral surfaces so that at least a part of the anchor portion is wider than the groove.

8. The heating device according to claim 4, wherein the anchor portion of the packing has a protruded portion on peripheral surfaces so that at least a part of the anchor portion is wider than the groove.

* * * * *